US010096203B2

(12) United States Patent
Boudreau et al.

(10) Patent No.: US 10,096,203 B2
(45) Date of Patent: Oct. 9, 2018

(54) AUTOMATIC ELECTRONIC GAMING SYSTEM TIMEOUT CALIBRATION

(71) Applicant: IGT Canada Solutions ULC, Moncton (CA)

(72) Inventors: Bradley Boudreau, Dieppe (CA); Yan Meunier, Sainte Marie de Kent (CA)

(73) Assignee: IGT Canada Solutions ULC, Moncton (CA)

( * ) Notice: Subject to any disclaimer, the term of this patent is extended or adjusted under 35 U.S.C. 154(b) by 208 days.

(21) Appl. No.: 14/969,070

(22) Filed: Dec. 15, 2015

(65) Prior Publication Data

US 2017/0169661 A1 Jun. 15, 2017

(51) Int. Cl.
*G06F 17/00* (2006.01)
*G07F 17/32* (2006.01)

(52) U.S. Cl.
CPC ................................ *G07F 17/3227* (2013.01)

(58) Field of Classification Search
CPC ... G07F 17/3227; H04L 1/188; H04L 1/1825; H04W 24/00; H04W 28/18
See application file for complete search history.

(56) References Cited

U.S. PATENT DOCUMENTS

2010/0098204 A1* 4/2010 Ratiu .................... H04J 3/0638 375/371
2012/0120848 A1* 5/2012 Hegde ................... H04L 69/162 370/255
2013/0121190 A1* 5/2013 Lu ......................... H04W 24/00 370/252
2014/0286313 A1* 9/2014 Fu ......................... H04W 36/08 370/331
2015/0119132 A1* 4/2015 Reynal Pasman ...... H04L 67/10 463/25
2015/0257081 A1* 9/2015 Ramanujan ............. H04L 45/24 370/329
2016/0035183 A1* 2/2016 Buchholz ............ G07F 17/3225 463/25
2016/0227494 A1* 8/2016 Chandrasekaran .......................... H04W 56/001
2016/0366022 A1* 12/2016 Finkelstein ............. H04L 41/12

* cited by examiner

*Primary Examiner* — Dmitry Suhol
*Assistant Examiner* — Carl V Larsen
(74) *Attorney, Agent, or Firm* — Sage Patent Group

(57) ABSTRACT

In one aspect, there is described a computer-implemented method of configuring timeout values for an electronic gaming system. The electronic gaming system includes an electronic gaming machine and a first host coupled to the electronic gaming machine through a network. The method includes: receiving a command to initiate timeout calibration through an input interface associated with the electronic gaming system; and in response to receiving the command: i) sending a plurality of test messages between the electronic gaming machine and the first host; ii) determining transmission times for the test messages; iii) based on the determined transmission times, automatically determining one or more timeout values; and iv) configuring one or both of the electronic gaming machine and the first host based on the determined timeout values.

19 Claims, 5 Drawing Sheets

AUTOMATIC ELECTRONIC GAMING SYSTEM TIMEOUT CALIBRATION

TECHNICAL FIELD

The present disclosure relates generally to electronic gaming systems in which an electronic gaming machine interacts with one or more remote hosts to provide a game to a player and, more particularly, to methods, systems and devices that automatically calibrate timeout values for communications in such systems.

BACKGROUND

Electronic gaming machines ("EGMs") are often situated in a casino or other gaming establishment which houses many EGMs at a single site. For example, multiple video poker terminals may be provided in a single location.

Electronic gaming machines in such environments often connect to one or more hosts in order to provide a game. Some EGMs may act as client devices by displaying game data that is generated by the host. The EGM may communicate with the host through a network and various configuration settings may be configured and applied to such communications.

In some instances, many EGMs are deployed at a common location. For example, a game floor of a casino or other gaming establishment may include numerous EGMs. Initializing the various configuration settings that are used for the communications between the EGM and the host may be a time-consuming task and tools and systems for assisting in initializing such settings may be helpful.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

In one aspect, there is described a computer-implemented method of configuring timeout values for an electronic gaming system. The electronic gaming system includes an electronic gaming machine and a first host coupled to the electronic gaming machine through a network. The method includes: receiving a command to initiate timeout calibration through an input interface associated with the electronic gaming system; and in response to receiving the command: i) sending a plurality of test messages between the electronic gaming machine and the first host; ii) determining transmission times for the test messages; iii) based on the determined transmission times, automatically determining one or more timeout values; and iv) configuring one or both of the electronic gaming machine and the first host based on the determined timeout values.

In another aspect, there is described an electronic gaming system. The electronic gaming system includes an input interface, a first host, and an electronic gaming machine coupled to the first host through a network. The electronic gaming system includes one or more processors. The processors are configured to: receive a command to initiate timeout calibration through an input interface associated with the electronic gaming system; and in response to receiving the command: i) send a plurality of test messages between the electronic gaming machine and the first host; ii) determine transmission times for the test messages; iii) based on the determined transmission times, automatically determine one or more timeout values; and iv) configure one or both of the electronic gaming machine and the first host based on the determined timeout values.

In yet another aspect, there is described a non-transitory computer readable medium containing instructions which, when executed, cause a processor to receive a command to initiate timeout calibration through an input interface associated with the electronic gaming system; and in response to receiving the command: i) send a plurality of test messages between the electronic gaming machine and the first host; ii) determine transmission times for the test messages; iii) based on the determined transmission times, automatically determine one or more timeout values; and iv) configure one or both of the electronic gaming machine and the first host based on the determined timeout values.

Other aspects and features of the present application will become apparent to those ordinarily skilled in the art upon review of the following description of specific embodiments of the application in conjunction with the accompanying figures.

Figure 1:
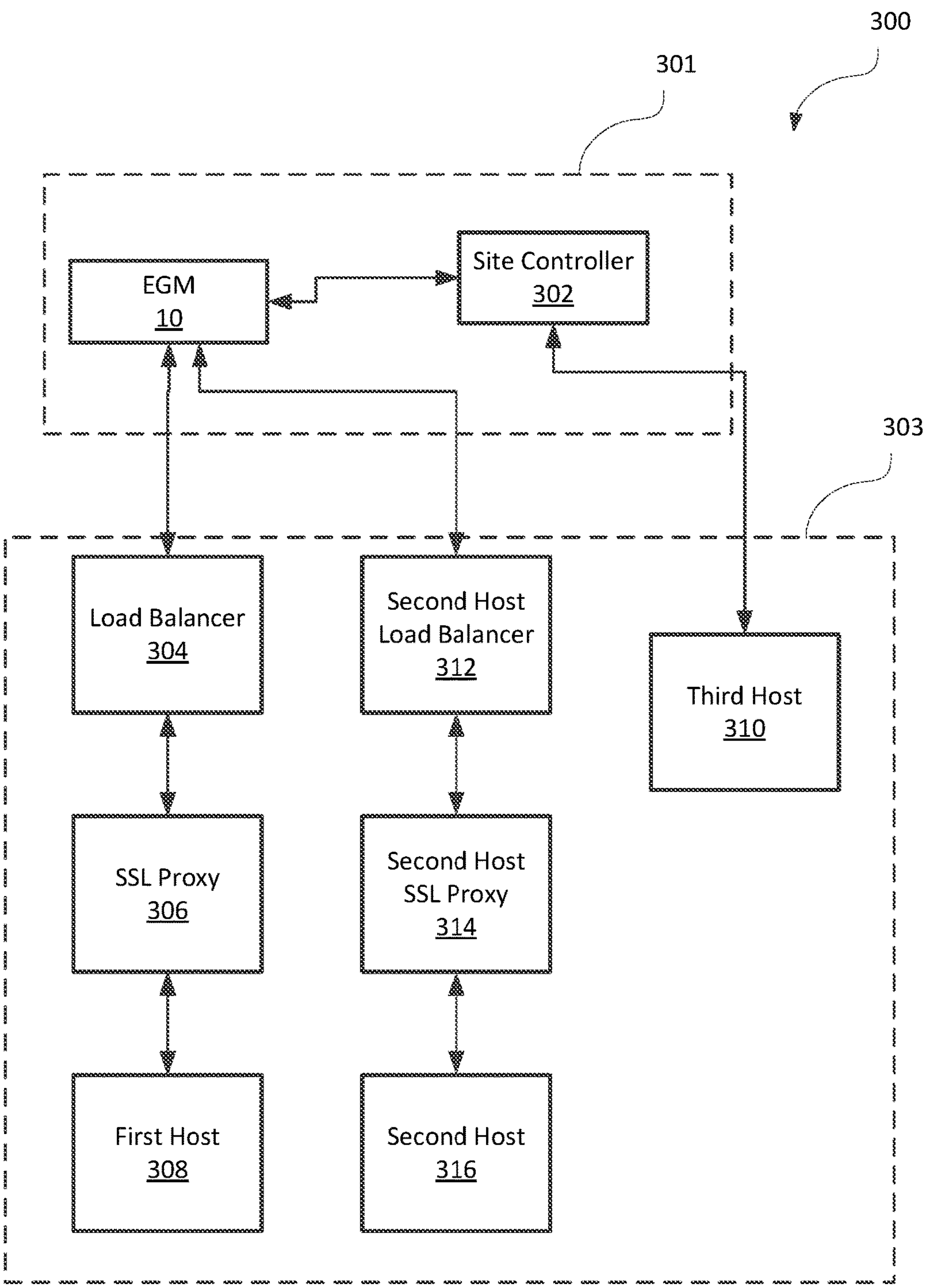
FIG. 1 shows a block diagram of an example electronic gaming system in accordance with example embodiments of the present disclosure.

Reference will first be made to FIG. 1, which illustrates an example electronic gaming system 300. The electronic gaming system is used for providing a game through an electronic gaming machine (EGM) 10 to a player. The game may be a wager-based game which allows a player to wager a bet on an outcome of the game. The EGM 10 may also be referred to as a video lottery terminal (VLT). By way of example, the game may be a slot-machine or video poker game.

The example electronic gaming system 300 of FIG. 1 includes on-site equipment 301 and off-site equipment 303. The on-site equipment 301 is equipment that is located at the facility that houses the EGMs, such as a casino or other gaming establishment.

The on-site equipment 301 includes the EGM 10 and a site controller 302 that is connected to the EGM 10. The site controller 302 may communicate with the EGM 10 through a Hypertext Transfer Protocol Secure (HTTPS) protocol. While FIG. 1 illustrates a direct connection between the EGM 10 and the site controller 302, in practice the connection may be made over a network.

The site controller 302 provides management functions for the EGM 10. For example, the site controller 302 may allow an operator of the facility that houses the EGM 10, such as a casino operator, to access various management functions associated with the EGM 10. For example, the site controller 302 may include a retailer terminal (not shown) that may be accessed by the casino or other gaming establishment that houses the EGMs.

The retailer terminal may be configured to monitor the status of the EGMs 10 on the site. For example, the retailer terminal may gather information about the operating status of the EGMs 10, error conditions affecting any of the EGMs, suspicious behavior at any of the EGMs, or other information. The retailer terminal is operated by an operator who may, for example, be located in an accessible location such as a cash-out area to allow players of the EGMs to speak with an operator of the retailer terminal if they are having difficulty with a particular one of the EGMs. The retailer terminal may also be used to validate tickets or receipts associated with EGMs.

The on-site equipment 301 communicates with various off-site equipment 303. More particularly, various features that are provided through the on-site equipment 301 may by hosted features that are provided by accessing a host, which may be located off-site. The off-site equipment 303 may be back-end equipment that is operated by a manufacturer, designer or retailer associated with the EGM 10. That is, the off-site equipment 303 may not be operated by the casino or other operator that runs the site where the on-site equipment 301 is situated.

In the example, the off-site equipment 303 includes a first host 308. The first host may be accessed by an EGM 10. The first host 308 is a configuration host which may be used to provide various configuration operations on an EGM 10. For example, the first host 308 may be used to associate a particular EGM 10 with a particular game. That is, the party that operates the off-site equipment 303 may provide different games to different EGMs 10 and the first host 308 may be used to assign a particular game to a particular EGM 10. When a game is assigned to an EGM 10, the first host 308 provides the EGM 10 with access information to inform the EGM 10 of an address that is associated with a second host 316 which provides that game. The access information may, for example, be a Uniform Resource Locator (URL).

The first host 308 may configure other features associated with an EGM 10 such as operating hours, etc. The first host 308 may also provide a user interface that may be accessed by the casino or other operator associated with the site housing the EGM 10. The user interface may allow the operator to set various configuration options for the EGM 10; for example, the operator may set the operating hours for the EGM 10.

Communications between the EGM 10 and the first host 308 may be routed through intermediary components that are provided in the off-site equipment 303. For example, the EGM 10 may connect with a load balancer 304, which connects with a proxy, such as a secure sockets layer (SSL) proxy 306, which connects with the first host 308. Thus, a communication from the EGM 10 travels first through the load balancer 304, then to the SSL proxy 306 and then to the first host 308.

While a single configuration host is illustrated in FIG. 1 (i.e., the first host 308 is the only configuration host in the example), in practice, the off-site equipment 303 may include multiple instances of the configuration host. This architecture may assist when the configuration host is experiencing heavy loads. For example, when a plurality of EGMs 10 are installed at a site and are initialized at similar times, the configuration host may experience heavy loads and the multiple instances of the configuration hosts may be used to distribute such loads.

The load balancer 304 may be used in order to distribute communications from the EGMs 10 to the plurality of configuration hosts. That is, the load balancer 304 may be used to route a communication from an EGM 10 to a particular one instance of the configuration host. This routing is performed to attempt to balance the various communications between the instances of the configuration host.

Communications between the EGM 10 and the load balancer 304 may be performed using the HTTPS protocol.

An SSL proxy 306 also acts as an intermediary for communications between the EGM 10 and the first host 308. The SSL proxy is a termination point for encryption. That is, the SSL proxy encrypts outgoing communications from the first host 308 and decrypts incoming communications to the first host 308. The SSL proxy 306 connects to the load balancer 304 (and hence the EGM 10) through a secure protocol, such as HTTPS and connects to the first host 308 through an unsecure protocol, such as HTTP.

The off-site equipment 303 also includes a second host 316 which is a game server. The game server provides, to the EGM 10 a game that is displayed on a display of the EGM. More particularly, the game server provides game data to the EGM 10 which displays the game to a player based on the game data. The game data is provided to the EGM 10 while a player is playing the game. The game server may, for example, determine an outcome of a game and provide game data based on the determined outcome.

The EGM 10 may function primarily as a passive input and output device. That is, the EGM 10 receives input through an input interface associated therewith, provides the received input to the game server, which then executes the game and provides game data to the EGM 10 which is rendered on the EGM 10. For example, in some embodiments, the game server may provide the game as an HTML5 game to the EGM 10 and the EGM 10 may function similar to a web-browser by rendering received HTML5 data.

In other embodiments, the EGM 10 may include some game code which may be used, in conjunction with the game server, to provide the game.

Much like the first host 308, the second host 316 may connect to the EGM 10 through one or more intermediary devices which may be provided in the off-site equipment 303. For example, the EGM 10 may connect through a second host load balancer 312 and a second host SSL proxy 314.

The second host load balancer 312 functions similar to the load balancer 304 that services the first host 308; it balances traffic from EGMs 10 among various instances of the game server. That is, while a single second host 316 is illustrated in FIG. 1, in practice there may be multiple instances of the second host 316. The second host load balancer 312 connects with the EGM 10 over a secure connection, such as HTTPS.

The second host SSL proxy 314 is connected to the second host load balancer 312 and the second host 316 and functions similar to the SSL proxy 306 that services the first host 308; it is a termination point for encryption. That is, the second host SSL proxy 314 encrypts outgoing communications from the second host 316 and decrypts incoming communications to the second host 316. The second host SSL proxy 314 connects to the second host load balancer 312 (and hence the EGM 10) through a secure protocol, such as HTTPS and connects to the second host 316 through an unsecure protocol, such as HTTP.

The off-site equipment 303 also includes a third host 310. The third host connects to and services the site controller 302. The third host 310 may be an auditing system which tracks various parameters associated with the site-controller and EGMs 10 located on-site such as an amount of cash in, an amount of cash out, a number of games won, etc.

The site controller 302 may connect to the third host 310 using a user datagram protocol (UDP).

The off-site equipment 303 (such as the hosts 308, 316, 310) connects to the on-site equipment 301 through a network which may include, for example, the Internet and/or a private network.

Components within the electronic gaming system 300 may be configured with timeout values that are applied to communications with other components in the electronic gaming system 300. Each timeout value is an amount of time that is allocated for a communications occurring between device component pairs associated with the timeout value. When communications are not occurring within the time allotted by the timeout value, a device associated with the timeout value may conclude that the communication was unsuccessful and may, for example, re-send the communication or ignore a late-received communication. For example, when one of the components sends a message to another of the components, a response to that message may be expected by the sending component. If a response is not received within the time allotted by the timeout value, then the sending component may determine that the transmission of the message was unsuccessful and may act accordingly; for example, by resending the communication and/or generating an error message for display to an operator.

By way of example, a timeout value may be associated with communications between the EGM 10 and one of the hosts. For example, a timeout value may be associated with communications between the EGM 10 and the first host 308. Similarly, another timeout value may be associated with communications between the EGM 10. This timeout value may control the amount of time that is allotted for communications between the EGM 10 and the first host 308. If a communication does not take place within the allotted time, then it may be considered an unsuccessful communication.

Similarly, a further timeout value may control the amount of time that is allotted for communications between the EGM 10 and the second host 316 and a further timeout value may control the amount of time that is allotted for communications between the site controller 302 and the third host 310.

Additional timeout values may control communications between intermediary components (such as load balancers 304, 312, SSL proxies 306, 314) and EGMs 10, hosts 308, 316 or other intermediary components. For example, a timeout value may specify the amount of time allotted for communications between the EGM 10 and the load balancer 304 associated with the first host 308. Another timeout value may specify the amount of time allotted for communications between the EGM 10 and the second host load balancer 312. A further timeout value may specify the amount of time allotted for communications between the load balancer 304 associated with the first host 308 and the SSL proxy 306 associated with the first host and yet a further timeout value may specify the amount of time allotted for communications between the second host load balancer 312 and the second host SSL proxy 314.

Yet a further timeout value may specify the amount of time allotted for communications between the SSL proxy 306 and the first host 308 and another timeout value may specify the amount of time allotted for communications between the second host SSL proxy 314 and the second host 316.

A further timeout value may specify the amount of time allotted for communications between the load balancer 304 and the first host 308 and yet a further timeout may specify the amount of time allotted for communications between the second host load balancer 312 and the second host 316.

Each timeout value may be stored in memory of the components that are associated with that timeout value and may be applied by that component for communications that are affected by that timeout value. For example, the first host 308 and the EGM 10 may be configured with a timeout value that is to be applied to communications between the first host and the EGM 10. For example, the component may include a processor that applies the timeout value to communications that are to be controlled by that timeout value.

The electronic gaming system 300, therefore, relies on a plurality of timeout values that are applied to communications within the electronic gaming system 300. As will be described in greater detail below, one or more of the timeout values may be automatically determined.

The automatic determination of timeout values may be initiated through an input interface provided in the electronic gaming system 300. The input interface is a user interface, such as a user input device (e.g., a mouse, a touchscreen, a button, or an input device of another type) that may be activated by an operator to issue a command to the electronic gaming system 300 to instruct the electronic gaming system 300 to automatically determine one or more timeout values. That is, a command to initiate timeout calibration may be input through an input interface associated with the electronic gaming system. The input interface that is used to issue such a command may be provided on the EGM 10, the site controller 302 (e.g., a retailer terminal), or on one of the hosts 308, 316, 310. The input interface may, in some embodiments, take the form of a graphical user interface that is provided by one of the hosts 308, 316, 310 and that may be accessed from a remote system that operates outside of the electronic gaming system 300; for example, the electronic gaming system 300 may provide a web interface which may be accessed by another system, such as a computer having a web browser.

After the electronic gaming system 300 has been instructed to initiate the automatic determination of timeout values, the electronic gaming system 300 may send a plurality of test messages between host(s) 308, 316 and the EGM(s) 10. For example, test messages may be sent from the first host 308 to the EGM 10 and from the second host 316 to the EGM 10. The test messages may be time stamped by the sender and the various intermediary components that the message passes through may apply a further timestamp to the message. Then, when the EGM 10 receives the test message, the EGM 10 records the time of arrival of the test message (e.g., by applying a further time stamp to the message). The time stamps may be used to determine the various timeout values. By way of example, using these timestamps, any one or more of the following timeout values may be determined: a timeout value for communications between the EGM 10 and the first host 308; a timeout value for communications between the EGM 10 and the load balancer 304; a timeout value for communications between the load balancer 304 and the SSL proxy 306; a timeout value for communications between the SSL proxy and the first host 308; and a timeout value for communications between the load balancer 304 and the first host 308. In at least some embodiments, the timeout values may be determined by sending a plurality of upstream test messages from the EGM 10 to the first host 308 and by also sending a plurality of downstream test messages from the first host 308 to the EGM 10. In some embodiments, a different timeout value is determined for upstream communications than for downstream communications.

The electronic gaming system 300 may also send a plurality of test messages between the second host 316 and the EGM 10. Such test messages are also time stamped by the sender and the various intermediary components that the message passes through (e.g., the second host load balancer 312 and the second host SSL proxy 314). The recipient of the test message (such as the EGM 10) then time stamps the time of receipt of the test message. The time stamps may be used to determine timeout values including one or more of the following: a timeout value for communications between the EGM 10 and the first host 308; a timeout value for communications between the EGM 10 and the second host load balancer 312; a timeout value for communications between the second host load balancer 312 and the second host SSL proxy 314; a timeout value for communications between the second host SSL proxy 314 and the second host 316; and a timeout value for communications between the second host load balancer 312 and the second host 316. In at least some embodiments, the timeout values may be determined by sending a plurality of upstream test messages from the EGM 10 to the second host 316 and by also sending a plurality of downstream test messages from the second host 316 to the EGM 10.

The electronic gaming system 300 may also send a plurality of test messages between the site controller 302 and the third host 310 in order to determine one or more timeout value applicable to communications between the site controller 302 and the third host 310. These test messages are time stamped by both sender and recipient and these time stamps are used to determine a timeout value to be used for communications between the site controller 302 and the third host 310.

The electronic gaming system 300 may have a different architecture than that illustrated in FIG. 1. For example, in some embodiments, one or more of the hosts may not be provided and at least some of the functionality provided by the hosts may be provided in on-site equipment 301, such as an EGM 10.

Furthermore, while different blocks have been used to illustrate the various components of the electronic gaming system 300, it will be understood that some of these components may be provided on a common physical system. That is, at least some of the blocks may represent different layers rather than different physical systems.

Figure 2:
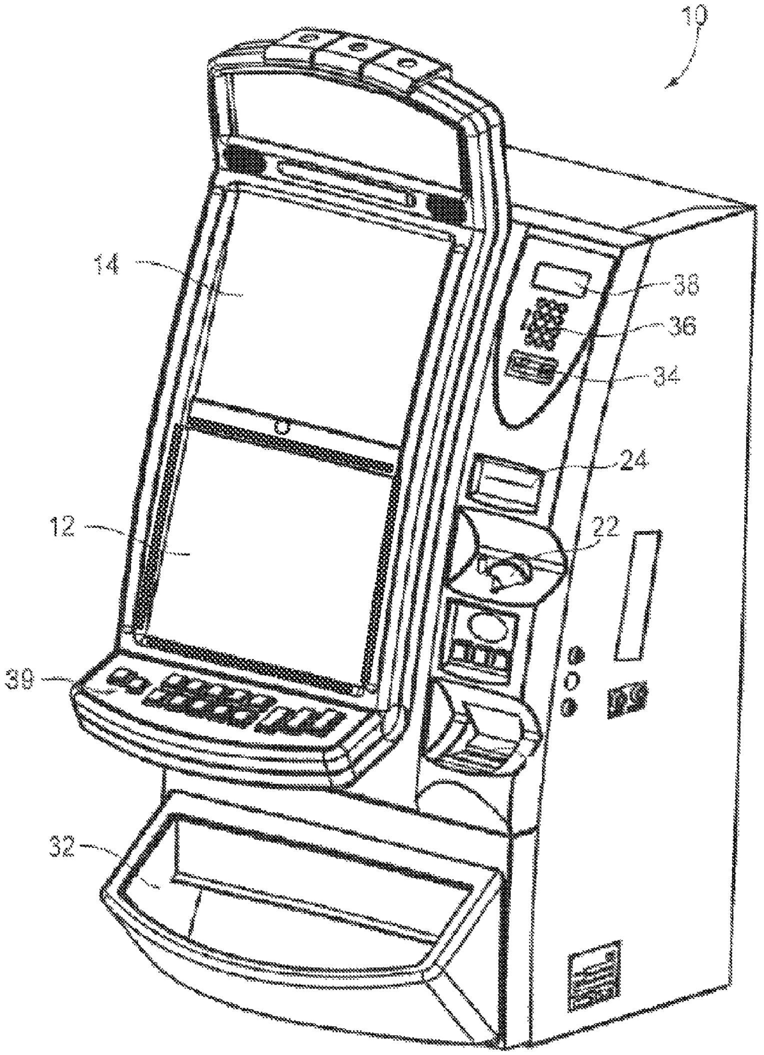
FIG. 2 shows a perspective view of an example EGM in accordance with example embodiments of the present disclosure.

Reference will now be made to FIG. 2, which illustrates an example electronic gaming machine (EGM) 10 in perspective view. The example electronic gaming machine may be included in an electronic gaming system 300 of the type described above with reference to FIG. 1.

The EGM 10 includes a primary display 12 which may be of a variety of different types including, for example, a thin film transistor (TFT) display, a liquid crystal display (LCD), a cathode ray tube (CRT), a light emitting diode (LED) display, an organic light emitting diode (OLED) display, or a display of another type.

The EGM 10 of FIG. 1 also includes a second display 14. The second display provides game data or other information in addition to the display 12. The second display 14 may provide static information, such as an advertisement for the game, the rules of the game, pay tables, pay lines, or other information, or may even display the main game or a bonus game along with the display 12. The second display 14 may utilize any of the display technologies noted above (e.g., LED, OLED, CRT, etc.).

The EGM 10 is equipped with one or more input interfaces. For example, one or both of the displays 12 and 14 may be a touchscreen which includes a touchscreen layer, such as a touchscreen overlay at a display surface. The touchscreen layer is touch-sensitive such that an electrical signal is produced in response to a touch. In an embodiment, the touchscreen is a capacitive touchscreen which includes a transparent grid of conductors. Touching the screen causes a change in the capacitance between conductors, which allows the location of the touch to be determined. The touchscreen may be configured for multi-touch.

Other input interfaces may be provided instead of or in addition to the touchscreen. For example, a keypad 36 may accept player input, such as a personal identification number (PIN) or any other player information. A display 38 above keypad 36 displays a menu for instructions and other information and provides visual feedback of the keys pressed. The keypad 36 may be an input device such as a touchscreen, or dynamic digital button panel, in accordance with some embodiments.

Control buttons 39 may also act as an input interface and be included in the EGM. The control buttons 39 may include buttons for inputting various input commonly associated with a game provided by the EGM 10. For example, the control buttons 39 may include a bet button, a repeat bet button, a spin reels (or play) button, a maximum bet button, a cash-out button, a display pay lines button, a display payout tables button, select icon buttons, or other buttons. In some embodiments, one or more of the control buttons may be virtual buttons which are provided by a touchscreen.

The EGM 10 may also include currency, credit or token handling mechanisms for receiving currency, credits or tokens required for game play or for dispensing currency, credits or tokens based on the outcome of the game play. A coin slot 22 may accept coins or tokens in one or more denominations to generate credits within EGM 10 for playing games. An input slot 24 for an optical reader and printer receives machine readable printed tickets and outputs printed tickets for use in cashless gaming.

A coin tray 32 may receive coins or tokens from a hopper upon a win or upon the player cashing out. However, the EGM 10 may be a gaming terminal that does not pay in cash but only issues a printed ticket which is not legal tender. Rather, the printed ticket may be converted to legal tender elsewhere.

In some embodiments, a card reader interface 34, such as a card reader slot, may allow the EGM 10 to interact with a stored value card, identification card, or a card of another type. A stored value card is a card which stores a balance of credits, currency or tokens associated with that card. An identification card is a card that identifies a user. In some cases, the functions of the stored value card and identification card may be provided on a common card. However, in other embodiments, these functions may not be provided on the same card. For example, in some embodiments, an identification card may be used which allows the EGM 10 to identify an account associated with a user. The identification card uniquely identifies the user and this identifying information may be used, for example, to track the amount of play associated with the user (e.g., in order to offer the user promotions when their play reaches certain levels). The identification card may be referred to as a player tracking card. In some embodiments, an identification card may be inserted to allow the EGM 10 to access an account balance associated with the user's account. The account balance may be maintained at a host system or other remote server accessible to the EGM 10 and the EGM 10 may adjust the balance based on game play on the EGM 10. In embodiments in which a stored value card is used, a balance may be stored on the card itself and the balance may be adjusted to include additional credits when a winning outcome results from game play.

The stored value card and/or identification card may include a memory and a communication interface which allows the EGM 10 to access the memory of the stored value card. The card may take various forms including, for example, a smart card, a magnetic strip card (in which case the memory and the communication interface may both be provided by a magnetic strip), a card with a bar code printed thereon, or another type of card conveying machine readable information. In some embodiments, the card may not be in the shape of a card. Instead, the card may be provided in another form factor. For example, in some embodiments, the card may be a virtual card residing on a mobile device such as a smartphone. The mobile device may, for example, be configured to communicate with the EGM 10 via a near field communication (NFC) subsystem.

The nature of the card reader interface 34 will depend on the nature of the cards which it is intended to interact with. The card reader interface may, for example, be configured to read a magnetic code on the stored value card, interact with pins or pads associated with the card (e.g., if the card is a smart card), read a bar code or other visible indicia printed on the card (in which case the card reader interface 34 may be an optical reader), or interact with the card wirelessly (e.g., if it is NFC enabled). In some embodiments, the card is inserted into the card reader interface 34 in order to trigger the reading of the card. In other embodiments, such as in the case of NFC enabled cards, the reading of the card may be performed without requiring insertion of the card into the card reader interface 34.

The embodiments described herein are implemented by physical computer hardware. The embodiments described herein provide useful physical machines and particularly configured computer hardware arrangements of computing devices, servers, electronic gaming terminals, processors, memory, networks, for example. The embodiments described herein, for example, are directed to computer apparatuses, and methods implemented by computers through the processing of electronic data signals.

At least some computer hardware features cannot be omitted or substituted for mental means without having a material effect on the operation and structure of the embodiments described herein. The computer hardware described herein is not merely used to perform steps expeditiously and in an efficient manner.

Figure 3:
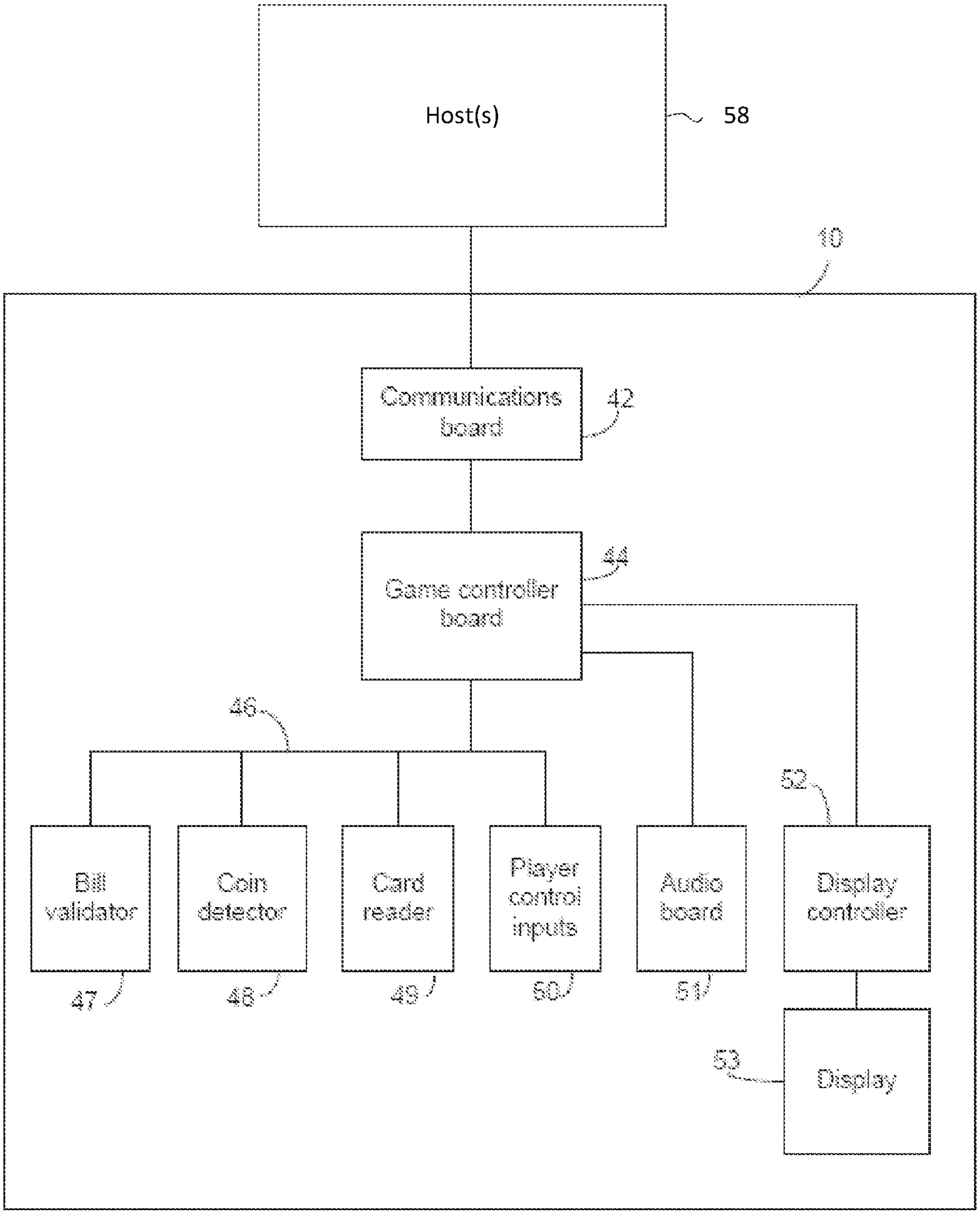
FIG. 3 illustrates a block diagram of an EGM in accordance with an embodiment of the present disclosure.

Referring now to FIG. 3, a block diagram of an EGM 10 is illustrated. The example EGM 10 is linked to one or more hosts 58, which may include the first host 308 illustrated in FIG. 1 and/or the second host 316 illustrated in FIG. 1. As illustrated in FIG. 1, the connection with the hosts(s) 58 may not be direct; it may be through a network and various intermediary components or devices.

The host(s) 58 may provide the EGM 10 with instructions for carrying out game routines. The host(s) 58 may also manage a player account and may adjust a balance associated with the player account based on game play at the EGM 10.

The EGM 10 includes a communications board 42 which may contain conventional circuitry for coupling the EGM to a local area network (LAN) or another type of network using any suitable protocol, such as the Game to System (G2S) standard protocol. The communications board 42 may allow the EGM 10 to communicate with the host system 41 to enable software download from the host system 41, remote configuration of the EGM 10, remote software verification, and/or other features. The G2S protocol document is available from the Gaming Standards Association and this document is incorporated herein by reference.

The communications board 42 transmits and receives data using a wireless transmitter, or it may be directly connected to a network running throughout the casino floor. The communications board 42 establishes a communication link with a master controller and buffers data between the network and a game controller board 44. The communications board 42 may also communicate with a network server, such as the host(s) 58, for exchanging information to carry out embodiments described herein.

The communications board 42 is coupled to a game controller board 44. The game controller board 44 contains memory and a processor for carrying out programs stored in the memory and for providing the information requested by the network. The game controller board 44 primarily carries out the game routines.

Peripheral devices/boards communicate with the game controller board 44 via a bus 46 using, for example, an RS-232 interface. Such peripherals may include a bill validator 47, a coin detector 48, a card reader interface such as a smart card reader or other type of card reader 49, and player control inputs 50 (such as buttons or a touch screen).

The game controller board 44 may also control one or more devices that produce the game output including audio and video output associated with a particular game that is presented to the user. For example an audio board 51 may convert coded signals into analog signals for driving speakers. A display controller 52, which typically requires a high data transfer rate, may convert coded signals to pixel signals for the display 53. The display controller 52 and audio board 51 may be directly connected to parallel ports on the game controller board 44. The electronics on the various boards may be combined onto a single board.

The EGM 10 includes one or more processors which may be provided, for example, in the game controller board 44 and/or the display controller 52. It will be appreciated that a single "main processor", which may be provided in the game controller board, for example, may perform all EGM-processing functions described herein or the processing functions may be distributed.

Memory associated with the EGM 10 may store one or more timeout values which may be used, for example, for communications with the host(s) 58. The memory may, for example, be provided on the communications board 42. The timeout values stored on the memory may, for example, include a first timeout value for communications with the first host 308, a second timeout value for communications with a load balancer 304 associated with the first host 308, a third timeout value for communications with the second host 316 and a fourth timeout value for communications with the second host load balancer 312. Other timeout values may be included in other embodiments instead of or in addition to these timeout values. The timeout values may be automatically determined by the electronic gaming system 300 using the techniques described herein.

A processor associated with the EGM 10, such as a processor on the communications board 42 may be configured to implement the timeout values. That is, the processor may be configured to enforce the timeout values for communications with the first host 308 or second host 316.

Figure 4:
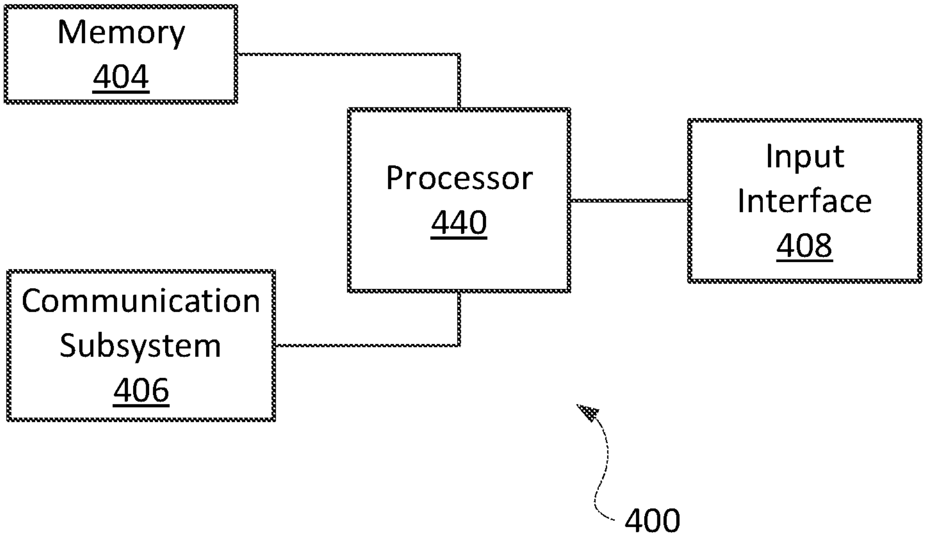
FIG. 4 illustrates a block diagram of a host in accordance with an embodiment of the present disclosure.

Reference will now be made to FIG. 4, which illustrates a block diagram of an example host 400. A host 400 of the type illustrated in FIG. 4 and described below may be used in the electronic gaming system 300 of FIG. 1 as any one or combination of the first host 308, the second host 316 or the third host 310.

The example host 400 includes a processor 440 which may be any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The processor may be coupled with memory (not shown) which stores processor-executable instructions for configuring the processor to perform a method, such as a method described herein. The processor is coupled with memory 404 which may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In the example, the processor 440 is coupled with an input interface 408. The input interface 408 is a device or subsystem that provides operator input to the host 400. By way of example, the input interface 408 may be any one or a combination of: a keyboard, a mouse, a touchscreen, a pushbutton, or another type of input interface.

The host 400 also includes a communication subsystem 406 coupled with the processor 440. The communication subsystem allows the host 400 to communicate with the EGMs 10.

Memory 404 stores one or more timeout values which may be used, for example, for communications with the EGMs. By way of example, where the host 400 is a configuration host of the type described above with reference to the first host 308 of FIG. 1 or a game server of the type described above with reference to the second host 316, the memory 404 may store a first timeout value for communications with the EGM 10 and a second timeout value for communications with an intermediary component through which communications with the EGM are routed, such as an SSL proxy. Similarly, where the host 400 is an auditing system of the type described above with reference to the third host 310, a timeout value for communications with the site controller 302 may be stored in memory.

A processor 440 associated with the host 400 may be configured to implement the timeout values. That is, the processor 440 may be configured to enforce the timeout values for communications with the EGM 10, or the site controller 302 as the case may be.

In some embodiments the memory that stores the timeout value(s) may be provided in the communication subsystem 406 and, in some embodiments, the timeout values may be enforced by a processor provided on the communication subsystem 406 itself.

Other components of the electronic gaming system 300 of FIG. 1 may also store timeout values and such components may include memory and a processor for storing and enforcing the timeout values. For example, the load balancer 304 associated with the first host 308 may store a first timeout value for communications with the EGM 10 and a second timeout value for communications with the SSL proxy 306. The SSL proxy 306, second host load balancer 312 and/or second host SSL proxy 314 may similarly store two timeout values—a first associated with downstream communications and a second associated with upstream communications. The site controller 302 may also store a timeout value for communications with the third host 310.

Figure 5:
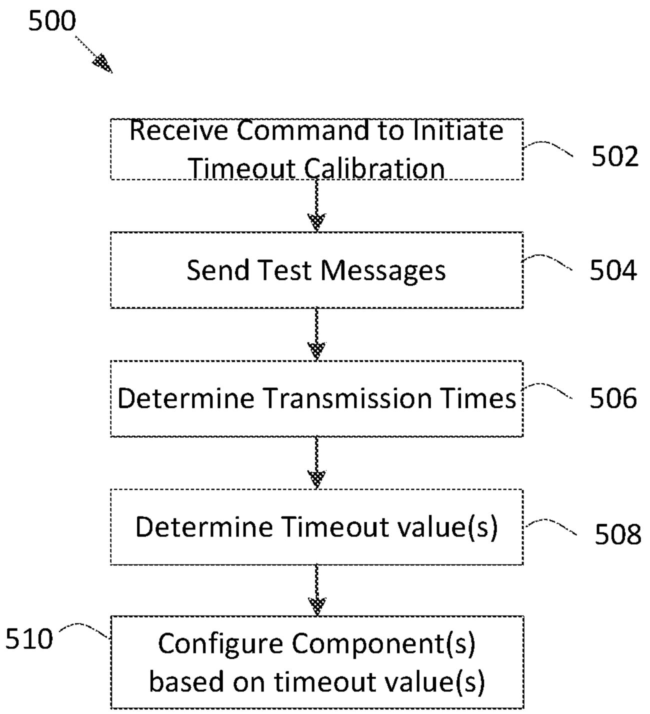
FIG. 5 illustrates a flowchart of a method of automatically calibrating timeout values in accordance with example embodiments of the present disclosure.

Referring now to FIG. 5, an example method 500 of automatically calibrating timeout values is illustrated in flowchart form. The method 500 may be performed by an electronic gaming system 300 such as electronic gaming system 300 of the type described above with reference to FIG. 1. For example, one or more processors associated with the electronic gaming system 300 (such as processors of any one or combination of the EGM 10, the first host 308, second host 316, third host 310, and/or site controller 302) may be configured to perform the method 500.

Prior to the performance of the method 500, clocks associated with various components of the electronic gaming system 300 may be synchronized. For example, the clocks for the EGM 10, first host 308, second host 316, third host 310, site controller 302, load balancer 304, SSL proxy 306, second host load balancer 312, and second host SSL proxy 314 may all be synchronized. The synchronization may be performed using network time protocol (NTP).

At operation 502, a command to initiate timeout calibration is received through an input interface associated with the electronic gaming system. The input interface may, for example be provided on or associated with one of: the EGM 10, the first host 308, the second host 316, the third host 310, or the site controller 302. In at least some embodiments, the command may be received when one or more EGMs are newly installed at a site. The newly installed EGM(s) may be placed in a calibration mode and the command may be received while one or more of the EGM(s) are in the calibration mode.

In response to receiving the command to initiate timeout calibration, at operation 504, a plurality of test messages are sent between components of the electronic gaming system 300. For example, a plurality of test messages are sent between an electronic gaming machine and a host. A plurality of test messages may be sent between the electronic gaming machine and the first host, which is the configuration server. These test messages may be of varying sizes. For example, the test messages may include a small test message, medium-sized test message and a large test message. The number of test messages that are sent between the electronic gaming machine and the first host may vary but a greater number of test messages will generally yield improved calibration results. In at least some embodiments, at least ten (10) test messages are sent between the EGM and the first host. The test message that are sent between the EGM 10 and the first host 308 may include upstream test messages—which are test messages sent from the EGM 10 to the first host 308—and downstream test messages—which are test messages sent from the first host 308 to the EGM 10.

In at least some embodiments, the test messages may include predetermined information which allows them to be recognized as test messages by the various equipment that the test message passes through or is received at.

In some embodiments in which the command to initiate the timeout calibration is received at the EGM 10, the first test message may be sent as an upstream message from the EGM 10 to the first host 308. Upon receiving the upstream test message, the first host 308 may then automatically send a downstream test message to the EGM 10. This test message is then received at the EGM 10.

In another embodiment in which the command to initiate the timeout calibration is received at a component provided in the off-site equipment 303, such as the first host 308, the first test message may be sent as a downstream test message from the first host 308 to the EGM 10. Upon receiving the downstream test message, the EGM 10 may then automatically send an upstream test message to the EGM 10.

The test messages are time stamped by the component that sent the test message. For example, when the EGM 10 is the initiator, the EGM may apply a time stamp indicating the time when the test message was sent. Similarly, when a host, such as the first host 308 is the initiator, the test message may be time stamped by the first host 308 to indicate the time when the test message was sent. Thus, upstream and downstream test messages may both be time-stamped to indicate the time when the test message was sent.

The component that receives the test message applies a further time stamp to the message to indicate the time of receipt of the test message. For example, when the EGM receives a downstream test message from the first host 308, the EGM may record the time of receipt of the test message and when the host (e.g., the first host) receives an upstream test message from the EGM, the host may record the time of receipt.

Further time stamps may be applied to the test message by intermediary components that handle the test message. For example, where communications between the EGM and the host (e.g., the first host 308) are routed through a load balancer, the test message may be further time stamped by the load balancer. When a test message passes through a load balancer, the load balancer applies a timestamp to reflect the current time when the load balancer handled the test message.

Similarly, the SSL proxy may apply a further time stamp to test messages routed through the SSL proxy to indicate the current time when the SSL proxy handled the test message.

In the same way that test messages are sent between the EGM and the first host 308, a plurality of test message may also be sent at operation 504 between the EGM and the second host 316, which is a game server that provides, to the EGM, a game that is displayed on the display of the EGM. These test messages may include both upstream and downstream test messages.

Similarly, in the same way that test messages are sent between the EGM and the first host 308, test messages may also be sent between the site controller and a further host, which may be referred to as the third host 310.

After a predetermined number of test messages have been sent, transmission times for the test messages may be determined at operation 506. The time stamps are used to determine the transmission times and transmission times may be determined for pairs of components that are to be associated with a timeout value. For example, the transmission times may include and one or a combination of: a transmission time between the EGM 10 and the first host 308 (which may be determined based on the time stamp applied by the sender and the time of receipt of the received test message), a transmission time between the EGM 10 and the second host 316 (which may be determined based on the time stamp applied by the sender and the time of receipt of the received test message); a transmission time between the site controller 302 and the third host 310 (which may be determined based on the time stamp applied by the sender and the time of receipt of the received test message); a transmission time between the EGM 10 and the load balancer 304 (which may be determined based on a time stamp applied at the EGM and a timestamp applied at the load balancer 304); a transmission time between the SSL proxy 306 and the load balancer 304 (which may be determined based on a time stamp applied at the SSL proxy 306 and a time stamp applied at the load balancer 304); a transmission time between the SSL proxy 306 and the first host 308 (which may be determined based on a time stamp applied at the SSL proxy and a time stamp applied at the first host 308); a transmission time between the EGM 10 and the second host load balancer 312 (which may be determined based on a time stamp applied at the EGM and a timestamp applied at the second host load balancer 312); a transmission time between the second host SSL proxy 314 and the second host load balancer 312 (which may be determined based on a time stamp applied at the SSL proxy 314 and a time stamp applied at the load balancer 312); and/or a transmission time between the second host SSL proxy 314 and the second host 316 (which may be determined based on a time stamp applied at the second host SSL proxy and a time stamp applied at the second host 316).

Since a plurality of test messages are sent, a plurality of transmission times for each pair of components that are to be associated with a timeout value are determined. By way of example, a plurality of transmission times for communications between the EGM 10 and the first host 308 may be determined.

After the transmission times are determined, at operation 508, one or more timeout values are automatically determined. The timeout values are determined based on the transmission times. A timeout value may be determined for any one or more of the following component-pairs: the EGM 10 and first host 308, the EGM 10 and second host 316, the EGM 10 and load balancer 304, the EGM 10 and second host load balancer 312, the load balancer 304 and the SSL proxy 306, the second host load balancer 312 and the second host SSL proxy 314, the SSL proxy 306 and the first host 308, the second host SSL proxy 314 and the second host 316, the site controller 302 and the third host 310. Such timeout values may be determined using associated transmission times. For example, a timeout value for the EGM 10 and first host 308 may be determined from transmission times between the EGM 10 and the first host 308. A timeout value for the EGM 10 and second host 316 may be determined from transmission times between the EGM 10 and the second host 316. A timeout value for the EGM 10 and load balancer 304 may be determined from transmission times between the EGM 10 and the load balancer 304. A timeout value for the EGM 10 and second host load balancer 312 may be determined from transmission times between the EGM 10 and the second host load balancer 312. A timeout value for the load balancer 304 and the SSL proxy 306 may be determined from transmission times between the load balancer 304 and the SSL proxy 306. A timeout value for the second host load balancer 312 and the second host SSL proxy 314 may be determined from transmission times between the second host load balancer 312 and the second host SSL proxy 314. A timeout value for the SSL proxy 306 and the first host 308 may be determined from transmission times between the SSL proxy 306 and the first host 308. A timeout value for the second host SSL proxy 314 and the second host 316 may be determined from transmission times between the second host SSL proxy 314 and the second host 316. A timeout value for the site controller 302 and the third host 310 may be determined from transmission times between the site controller 302 and the third host 310.

Various techniques may be used to determine the timeout value from the transmission times. For example, a lowest transmission time and a highest transmission time between the two components that are to be associated with a timeout value may be discarded and a timeout value determined based on the remaining transmission times. In some embodiments, determining the timeout value may include averaging a plurality of the transmission times and increasing the averaged amount by a buffer, which may be predetermined or may be determined using a predetermined formula.

The transmission times and/or timeout values may be determined by the EGM 10, the site controller 302, or a host (e.g., a first host 308, second host 316 or third host 310), or a combination thereof.

Next, at operation 510, the component(s) associated with the timeout values are configured with the associated timeout values. For example, the EGM 10 and first host 308 may be configured with a timeout that controls communications between these two components, the EGM 10 and second host 316 may be configured with a timeout that controls communications between these two components, the EGM 10 and load balancer 304 may be configured with a timeout that controls communications between these two components, the EGM 10 and second host load balancer 312 may be configured with a timeout that controls communications between these two components, the load balancer 304 and the SSL proxy 306 may be configured with a timeout that controls communications between these two components, the second host load balancer 312 and the second host SSL proxy 314 may be configured with a timeout that controls communications between these two components, the SSL proxy 306 and the first host 308 may be configured with a timeout that controls communications between these two components, the second host SSL proxy 314 and the second host 316 may be configured with a timeout that controls communications between these two components, the site controller 302 and the third host 310 may be configured with a timeout that controls communications between these two components.

At operation 510, the timeout values may be sent to the respective components and stored in memory of the associated component.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the enhancements to game components may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

In the present disclosure, the term "a processor" is intended to include both a single processor and also a plurality of processors coupled to one another which distribute operations among the processors.

Computer-executable instructions may be in many forms, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present game enhancements may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. While particular embodiments have been shown and described, it will be obvious to those skilled in the art that changes and modifications may be made without departing from this invention in its broader aspects. The appended claims are to encompass within their scope all such changes and modifications.

What is claimed is:

1. A computer-implemented method of configuring timeout values for an electronic gaming system, the electronic gaming system including an electronic gaming machine, a first host coupled to the electronic gaming machine through a network, and a load balancer coupled to the electronic gaming machine and the first host through the network, the method comprising:

receiving a command to initiate timeout calibration through an input interface associated with the electronic gaming system; and in response to receiving the command:

sending a plurality of test messages between the electronic gaming machine and the first host through the load balancer;

determining transmission times for the test messages;

based on the determined transmission times, automatically determining one or more timeout values; and configuring one or both of the electronic gaming machine and the first host based on the determined timeout values;

wherein the load balancer applies a further timestamp to test messages passing through the load balancer, the method further comprising:

determining at least one timeout value for communications between the load balancer and the electronic gaming machine based on a timestamp applied by the load balancer.

2. The method of claim 1, wherein sending a plurality of test messages includes:

sending an upstream test message from the electronic gaming machine to the first host, the upstream test message including a first timestamp; and receiving, from the first host, a downstream test message at the electronic gaming machine, the downstream test message including a second timestamp, and wherein the time stamps are used to determine transmission times for the test messages.

3. The method of claim 2, further comprising:

determining a time of receipt of the downstream test message at the electronic gaming machine, and wherein determining transmission times comprises determining a transmission time based on the time indicated by the second timestamp and the time of receipt of the downstream test message.

4. The method of claim 2, wherein the first host is configured to, upon receiving the upstream test message, send the downstream test message based on the upstream test message.

5. The method of claim 1, wherein the electronic gaming system includes a second host and wherein the method further includes, in response to receiving the command:

sending a plurality of test messages between the electronic gaming machine and the second host;

determining transmission times for the test messages sent between the electronic gaming machine and the second host;

based on the determined transmission times for the test messages sent between the electronic gaming machine and the second host, automatically determining one or more timeout values for communications between the electronic gaming machine and the second host; and configuring one or both of the electronic gaming machine and the second host based on the determined timeout values for communications between the electronic gaming machine and the second host.

6. The method of claim 5, wherein sending a plurality of test messages between the electronic gaming machine and the second host comprises:

sending an upstream test message from the electronic gaming machine to the second host, the upstream test message including a first timestamp; and receiving, from the second host, a downstream test message at the electronic gaming machine, the downstream test message including a second timestamp, and wherein the first and second timestamps are used to determine the transmission times for test messages sent between the electronic gaming machine and the second host.

7. The method of claim 1, wherein the test messages include test messages of varying sizes.

8. The method of claim 1, further comprising:

synchronizing clocks associated with the first host and the electronic gaming machine.

9. The method of claim 1, wherein the first host is a game server that provides, to the electronic gaming machine, a game that is displayed on a display of the electronic gaming machine.

10. The method of claim 1, wherein the electronic gaming system further includes a site controller coupled to the electronic gaming machine and a further host connected to the site controller through the network, the site controller providing management functions for the electronic gaming machine, and wherein the method further comprises, in response to receiving the command:

sending a plurality of test messages between the site controller and the further host;

determining transmission times for the test messages sent from between the site controller and the further host;

based on the determined transmission times for the test messages sent between the site controller and the further host, automatically determining one or more timeout values for communications between the site controller and the further host; and configuring one or both of the site controller and the further host based on the determined timeout values for communications between the site controller and the further host.

11. An electronic gaming system comprising:

an input interface;

a first host;

an electronic gaming machine coupled to the first host through a network; and a load balancer coupled to the electronic gaming machine and the first host through the network, the electronic gaming machine including one or more processors, the processors configured to:

receive a command to initiate timeout calibration through an input interface associated with the electronic gaming system; and in response to receiving the command:

send a plurality of test messages between the electronic gaming machine and the first host through the load balancer;

determine transmission times for the test messages;

based on the determined transmission times, automatically determine one or more timeout values; and configure one or both of the electronic gaming machine and the first host based on the determined timeout values;

wherein the load balancer is configured to apply a further timestamp to test messages passing through the load balancer, and wherein the processors are further configured to determine at least one timeout value for communications between the load balancer and the electronic gaming machine based on a timestamp applied by the load balancer.

12. The electronic gaming system of claim 11, wherein sending a plurality of test messages includes:

sending an upstream test message from the electronic gaming machine to the first host, the upstream test message including a first timestamp; and receiving, from the first host, a downstream test message at the electronic gaming machine, the downstream test message including a second timestamp, and wherein the time stamps are used to determine transmission times for the test messages.

13. The electronic gaming system of claim 12, wherein the processors are further configured to:

determine a time of receipt of the downstream test message at the electronic gaming machine, and wherein determining transmission times comprises determining a transmission time based on the time indicated by the second timestamp and the time of receipt of the downstream test message.

14. The electronic gaming system of claim 12, wherein the first host is configured to, upon receiving the upstream test message, send the downstream test message based on the upstream test message.

15. The electronic gaming system of claim 11, further comprising a second host and wherein the processors are further configured to, in response to receiving the command:

send a plurality of test messages between the electronic gaming machine and the second host;

determining transmission times for the test messages sent between the electronic gaming machine and the second host;

based on the determined transmission times for the test messages sent between the electronic gaming machine and the second host, automatically determine one or more timeout values for communications between the electronic gaming machine and the second host; and configure one or both of the electronic gaming machine and the second host based on the determined timeout values for communications between the electronic gaming machine and the second host.

16. The electronic gaming machine of claim 15, wherein sending a plurality of test messages between the electronic gaming machine and the second host comprises:

sending an upstream test message from the electronic gaming machine to the second host, the upstream test message including a first timestamp; and receiving, from the second host, a downstream test message at the electronic gaming machine, the downstream test message including a second timestamp, and wherein the first and second timestamps are used to determine the transmission times for test messages sent between the electronic gaming machine and the second host.

17. The electronic gaming system of claim 11, wherein the test messages include test messages of varying sizes.

18. The electronic gaming system of claim 11, wherein the processors are further configured to:

synchronize clocks associated with the first host and the electronic gaming machine.

19. The electronic gaming system of claim 11, wherein the first host is a game server that provides, to the electronic gaming machine, a game that is displayed on a display of the electronic gaming machine.

* * * * *